United States Patent Office 2,794,762
Patented June 4, 1957

2,794,762
BODY DEODORANT FOR INTERNAL USE

Franklin Howard Westcott, Tenafly, N. J., assignor to Walker Laboratories, Inc., Mount Vernon, N. Y., a corporation of New York No Drawing. Application December 9, 1950, Serial No. 200,093

7 Claims. (Cl. 167—55)

My invention relates to a non-toxic preparation which when taken internally in a small dosage by humans or animals, for example, dogs, will inhibit or prevent abnormal and normal body odors for a substantial period of time after the ingestion of the preparation.

So far as I am aware, it has never been proposed heretofore to eliminate body odors by means of ingested therapeutic agents which accomplish that purpose without any interference with any of the normal body functions. Every approach to the elimination of body odors has been external either to mask such odors as by perfume, mouth wash, and so forth, or to eliminate the local source as by shutting off perspiration through the use of astringents.

I have discovered that certain derivatives of chlorophyll can be ingested without impairment of any body function and that when ingested in dosages running from about 15 milligrams to 200 milligrams of active ingredient body odors are eliminated for periods of from 8 to 36 hours. Moreover, there is little possibility of over-dosage, since many unit doses may be taken at the same time without producing side effects.

Natural chlorophyll, the green pigment found in plants, contains the ingredients chlorophyll A and chlorophyll B in the ratio of about 2.5 to 3.5. Each of those ingredients contains chelated magnesium, a carboxy methyl group and a $-COOC_{20}H_{39}$ group, known as the phytyl group. By appropriate treatment the methyl and $C_{20}H_{39}$ groups can be removed from both chlorophyll A and chlorophyll B, yielding chlorophyllins, which contain, for example, two sodium or potassium atoms or ammonium radicals in place of the aforementioned methyl and $C_{20}H_{39}$ groups, depending upon the particular treatment used.

The direct deodorant properties of chlorophyll and certain derivatives thereof long have been recognized and utilized by direct external application of such substances to the sources of odor, such as ulcerated cancerous lesions, abscesses, cavities, necrotic skin, mucous membranes and so forth. However, there is nothing in such direct applications to suggest the possibility that ingestion in small dosages would have the indirect effect of so permeating the system as to eliminate the odors of the body, still less that so modest a daily dose would be effective.

I have found that it is possible to prepare non-toxic preparations, small dosages of which when taken internally will inhibit, reduce or prevent body odors, by the appropriate treatment of natural chlorophyll or certain chlorophyll derivatives, such as chlorophyllides, chlorophyllins, phaeophytins and pheophorbides. Preferably, however, I use chlorophyllins as a starting material, due to the much greater activity of the product prepared when they are used.

A specific example of how my deodorant preparation is made is as follows:

To 453 grams of a natural chlorophyll preparation derived from spinach and containing 47.6% of chlorophyll A and chlorophyll B in the ratio of about 7 to 3 was added 453 grams of 2 normal hydrochloric acid. This mass was hydrolyzed by digesting it on a water bath at 37° C. for two hours with constant stirring. The mixture was then filtered under pressure and the residue retained on the filter pad was dispersed in 350 ml. of water. The pH of the mixture was then raised to 8.0 by the addition of 2 normal sodium hydroxide solution. After that, the mixture was stirred well and then evaporated to dryness, yielding about 349 grams of residue. The dried residue was then pulverized, mixed with starch, sugar, maltose, dextrin, saccharin, magnesium stearate and flavoring, and the resultant mixture made into tablets weighing 428 milligrams and containing 100 milligrams of the dried residue.

In a second preparation, instead of natural chlorophyll there was used as a starting material a commercially available sodium magnesium chlorophyllin preparation. This commercially available chlorophyllin preparation contained 4% by weight of chlorophyllins A and B and contained 29% by weight of solids, the remainder being water. Thus, to 453 grams of this commercially available chlorophyllin preparation there was added 453 grams of 2 normal hydrochloric acid. The mass was hydrolyzed by digestion on a water bath at 37° C. for two hours with constant stirring. The mixture was then filtered under pressure, and the residue remaining on the filter pad was dispersed in 350 ml. of water. Thereafter, the pH of the mixture was raised to 8.0 by the addition of dilute aqueous sodium hydroxide. Upon evaporating the mixture to dryness, there remained 140 grams of sodium magnesium chlorophyllins and degradation products thereof, some of which contained and some of which did not contain magnesium. This residue was mixed with starch, dextrose and flavoring material, and the final mixture was prepared into tablets weighing 428 milligrams and containing 100 milligrams of the dried residue.

In a third preparation there is used as a starting material a sodium copper chlorophyllin preparation containing about 4% by weight of chlorophyllins A and B and containing about 30% by weight of solids, the remainder being water. Thus, to 453 grams of this chlorophyllin preparation there was added 453 grams of 2 normal hydrochloric acid. The mass was hydrolyzed by digestion on a water bath at 37° C. for two hours with constant stirring. The mixture was then filtered under pressure, and the residue remaining on the filter pad was dispersed in 350 ml. of water. Thereafter, the pH of the mixture was raised to 8.0 by the addition of dilute aqueous sodium hydroxide. Upon evaporating the mixture to dryness, there remained a residue containing sodium copper chlorophyllins and degradation products thereof, some of which contained and some of which did not contain copper. This residue was mixed with starch, dextrose and flavoring material, and the final mixture was prepared into tablets weighing 428 milligrams and containing 100 milligrams of the dried residue.

A fourth preparation is as follows: To 453 grams of raw chlorophyll A paste (solids 29 percent or 131.4 grams) were added 453 cc. of 2 N solution hydrochloric acid. This mass was digested in a water bath at 37° C. for 2 hours. Throughout the period of digestion the mass was constantly stirred. At the end of the period of digestion, 2 N solution of NaOH was added to bring the reaction of the mass to a pH of about 8.0. After thorough mixing by stirring, the mass was evaporated to dryness leaving a residuum of 121.2 grams of mixed solids. This solid residuum is mixed with adequate amounts of starch, dextrose and flavoring material as a filler, and the resultant mixture divided and compressed into tablets of such size that each one contains .05 gram of dried residuum with a total tablet weight of .3 gram.

Various modifications can be made in the specific procedures described to provide other preparations which fall within the scope of my invention. Thus, the particular source of the natural chlorophyll used in the first illustration is not critical, any of the natural chlorophylls, such as chlorophyll derived from alfalfa or cabbage, being suitable. Also, in place of the sodium magnesium chlorophyllin employed as a starting material in the second preparation and the sodium copper chlorophyllin used in the third preparation there can be used other sodium chlorophyllins in which the chelating metal is, for example, iron, zinc or nickel. These materials can be prepared in known manner by replacing the magnesium of chlorophyll using the appropriate metal salt of a carboxylic acid, such as ferrous acetate, zinc acetate, nickelous acetate, or the corresponding citrates, lactates, propionates, and so forth. Moreover, chlorophyllins in which the chelating metal is one of those already mentioned and in which the hydrogen atoms of the carboxy groups are replaced by the ammonium radical or by alkali metals other than sodium are useful starting materials.

In the digestion step it is necessary that an excess of dilute acid be present in the mixture, the water phase generally containing from about 2 to about 12% by weight of acid, in order that the desired hydrolysis can be effected. In general the digestion should be carried out for a period of from about 1 to 5 or more hours at a temperature within the range from about 30 to about 50° C. Other strong organic and inorganic acids, such as sulfuric acid, can be used in the digestion in place of hydrochloric acid, but do not appear to yield preparations having properties as desirable as those of the corresponding preparations prepared using hydrochloric acid. Also, other strong alkalis, such as potassium hydroxide, can be employed in place of sodium hydroxide in the specific preparations given, but in any event the sodium hydroxide or potassium hydroxide should be used in amounts such that the pH is adjusted to about 2 to 12, and preferably to about 7.5 to 8.5.

Reference is made to my copending application, Serial No. 779,215, filed October 10, 1947, and now abandoned, of which application the present application is a continuation-in-part.

I claim:

1. A non-toxic body deodorant for internal use comprising the product prepared by digesting an aqueous mixture containing at least one material selected from the group consisting of chlorophyll, chlorophyllides, chlorophyllins, phaeophytins and pheophorbides at a temperature from about 30 to about 50° C. for a period of from about one to about five hours while the water contains a strong acid in the amount of from about 2 to about 10% by weight, and adjusting the pH of the solid components of the mixture to within the range from about 2 to about 12 by means of a strong alkali, and drying the solid components to yield said product.

2. A deodorant as in claim 1 in which said material is chlorophyll.

3. A deodorant as in claim 1 in which said material is chlorophyll, in which the digesting is carried out at a temperature of about 37° C. using hydrochloric acid and in which the strong alkali is sodium hydroxide.

4. A deodorant as in claim 1 in which said material is chlorophyll, in which the digesting is carried out at a temperature of about 37° C. using hydrochloric acid, in which the strong alkali is sodium hydroxide and in which the pH of said solid components is about 7.5 to 8.5.

5. A deodorant as in claim 1 in which said material is chlorophyllins.

6. A deodorant as in claim 1 in which said material is chlorophyllins, in which the digesting is carried out at a temperature of about 37° C. using hydrochloric acid and in which the strong alkali is sodium hydroxide.

7. A deodorant as in claim 1 in which said material is chlorophyllins, in which the digesting is carred out at a temperature of about 37° C. using hydrochloric acid, in which the strong alkali is sodium hydroxide and in which the pH of said solid components is about 7.5 to 8.5.

References Cited in the file of this patent

UNITED STATES PATENTS

| | | |
|---|---|---|
| 2,120,667 | Gruskin | June 14, 1938 |
| 2,326,672 | Paschall | Aug. 10, 1943 |
| 2,341,986 | Hale | Feb. 15, 1944 |
| 2,567,362 | Berkman et al. | Sept. 11, 1951 |

FOREIGN PATENTS

| | | |
|---|---|---|
| 436,791 | Great Britain | Oct. 14, 1935 |

OTHER REFERENCES

Clinical Medicine, September 1945, p. 307.
Hager: Pharmazeutische Praxis, vol. 1 (1925), p. 999.
Ludwig: "Reportorium Pharmazeutischer Specialpreparate Sera und Impfstoffe," Basel, 1946, p. 594.
Schertz: Ind. & Eng., Chem., vol. 19, No. 10, October 1927, pp. 1152 and 1153.
Willstatter: J. A. C. S., vol. 27, 1915, pp. 323–345 (pp. 324 and 325 pertinent).
Lesser: The Drug & Cosmetic Industry, July 1944, pp. 38, 39, 111, 113 and 114.
Journal Amer. Medical Assn., October 24, 1953, p. 728.
Journal Amer. Vet. Med. Assn., vol. 123, No. 921, December 1953, pp. 540 and 541.